Aug. 26, 1969         H. PAPRITZ                3,463,579
            DEVICE FOR FINE ADJUSTMENT OF OPTICAL INSTRUMENTS
Filed Dec. 7, 1966                              3 Sheets-Sheet 1

INVENTOR
Hans Papritz
BY

United States Patent Office 3,463,579
Patented Aug. 26, 1969

3,463,579
DEVICE FOR FINE ADJUSTMENT OF OPTICAL INSTRUMENTS
Hans Papritz, Liebefeld, Bern, Switzerland, assignor to Haag-Streit A.G., Liebefeld, Bern, Switzerland
Filed Dec. 7, 1966, Ser. No. 599,954
Claims priority, application Germany, Dec. 20, 1965, H 58,027
Int. Cl. A61b 3/02
U.S. Cl. 351—38     8 Claims

ABSTRACT OF THE DISCLOSURE

A device for fine adjustment in vertical and horizontal direction of an optical, particularly an ophthalmological instrument, having an actuating lever swingable for fine horizontal adjustment and rotatable round its longitudinal axis for fine vertical adjustment.

---

Figure 1:
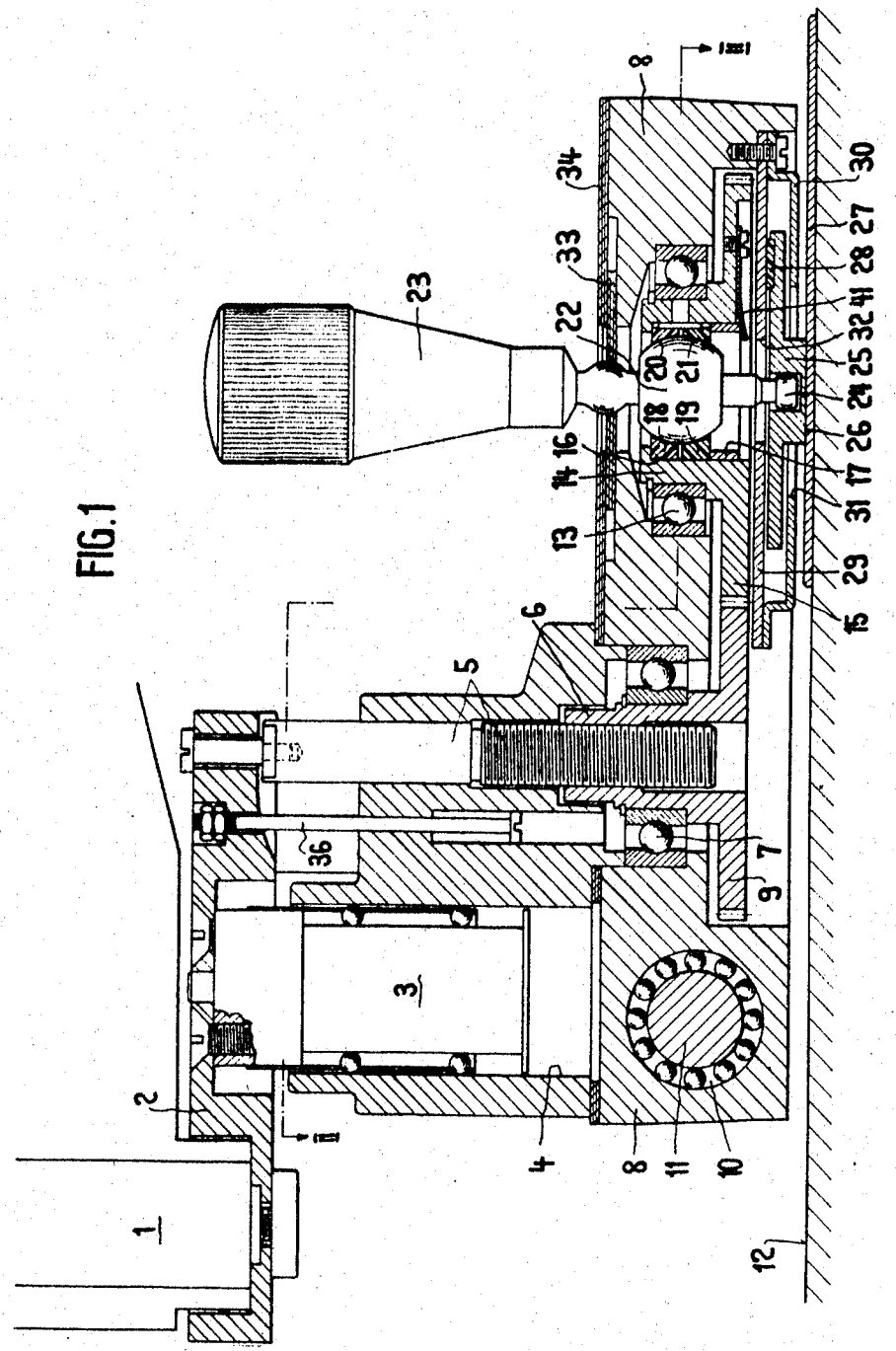

This invention relates to a device for fine adjustment of optical, particularly ophthalmological instruments, comprising a mechanism for fine vertical adjustment and an actuating lever swingable into any desired inclined position for fine adjustment in a horizontal plane.

In a prior fine adjusting device of this type, a hand-operable nut was provided on a vertical spindel of the instrument for fine vertical adjustment. It was thus necessary to effect fine horizontal adjustment by means of said lever and fine vertical adjustment by means of said nut, this being complicated because both hands of the operator are usually needed for simultaneous fine adjustment of the optical instrument in horizontal and vertical directions.

In another prior fine adjusting device of this type a shaft is rotatably mounted in the actuating lever, this shaft being coupled with a spindle for fine vertical adjustment through a cardan joint, an actuating knob being fixed at the upper end of said shaft extending from the upper end of the actuating lever. This device is still complicated in design. A separate rotatable system including a cardan joint and transmission gears has to be accommodated within the actuating lever. The lever has a spheric lower end resting on a horizontal surface or base and causing the fine horizontal adjustment of the instrument upon swinging of the lever round the center of its spheric lower end. Operation of the device is unpractical because the whole lever must be actuated for fine horizontal adjustment while only the said actuating knob must be rotated for fine vertical adjustment.

It is an object of this invention to provide a fine adjusting device which is simpler in design and operation. The device according to this invention broadly comprises an actuating lever rotatable round its longitudinal axis and operatively coupled with said mechanisms for fine vertical adjustment of the optical instrument, and a part slideably supported on a horizontal surface, the lower end of said actuating lever swingable and rotatably engaging said part. Since in this device the whole lever is swingable and rotatable the whole lever may always be seized for fine adjustment in any desired direction. Joints and gears for transmission of the lever rotation to the spindle or nut for fine vertical adjustment of the instrument may be disposed outside the actuating lever. However, rotation of the whole actuating lever necessitates engagement of the lower end of the actuating lever into a part supported on a horizontal surface in order that no undesired horizontal shifting of the instrument occurs when the inclined lever is rotated, as would be the case with the above prior device where the spheric lower end of the actuating lever directly rests on the horizontal surface or base.

Preferably the device may comprise a plate slideably supported on said surface, a recess in the upper face of said plate and a spheric portion at the lower end of said actuating lever engaging into said recess without clearance.

Further the actuating lever may be mounted swingably but non-rotatably in a rotatable carrier coupled with a spindle or nut of the mechanism for fine vertical adjustment of the instrument. A spheric portion of the lever may hereby be in frictional engagement with a substantially spheric pan of the carrier, or the actuating lever and carrier may be interconnected by a cardan joint.

Figure 2:
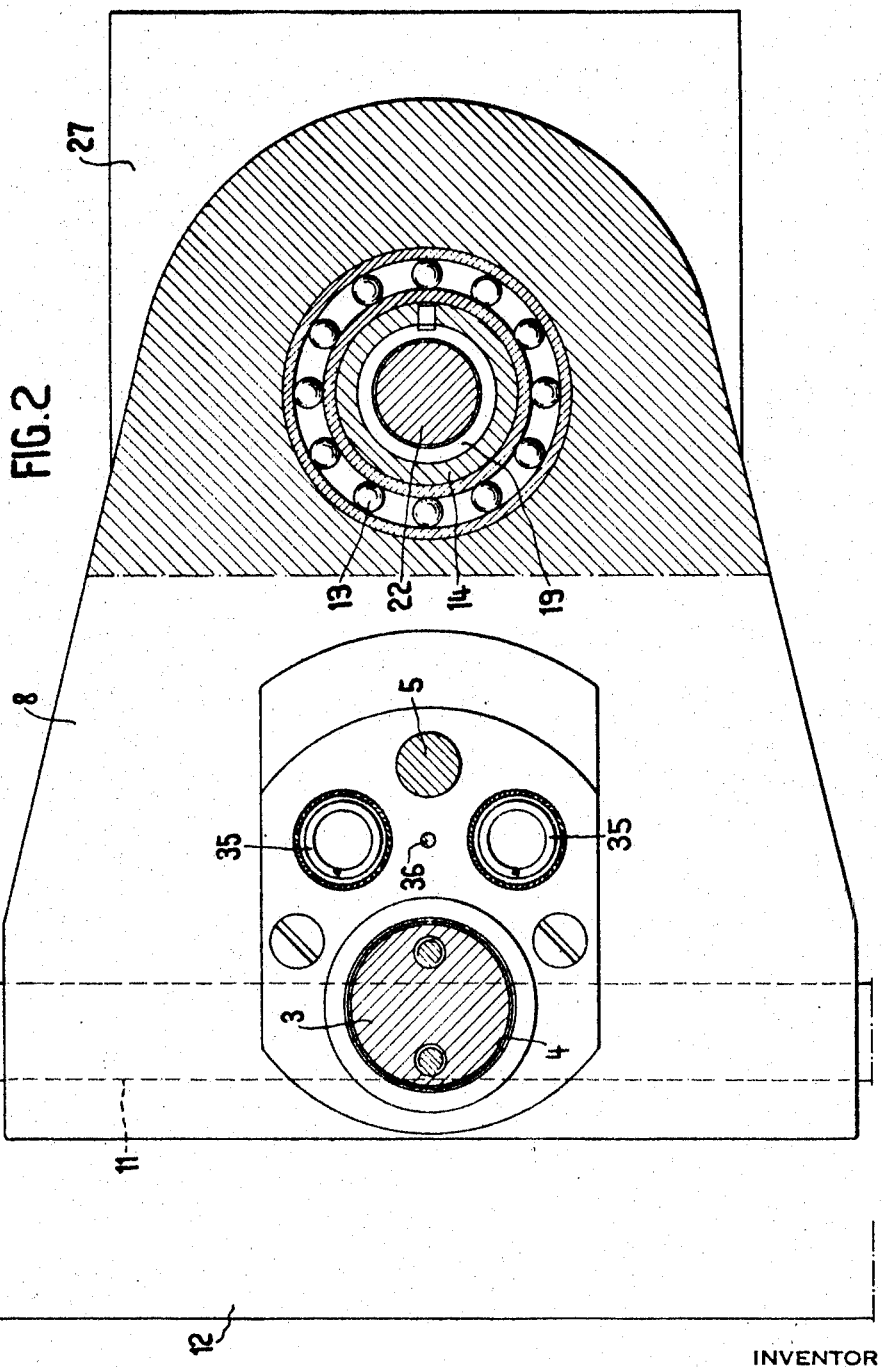
Figure 3:
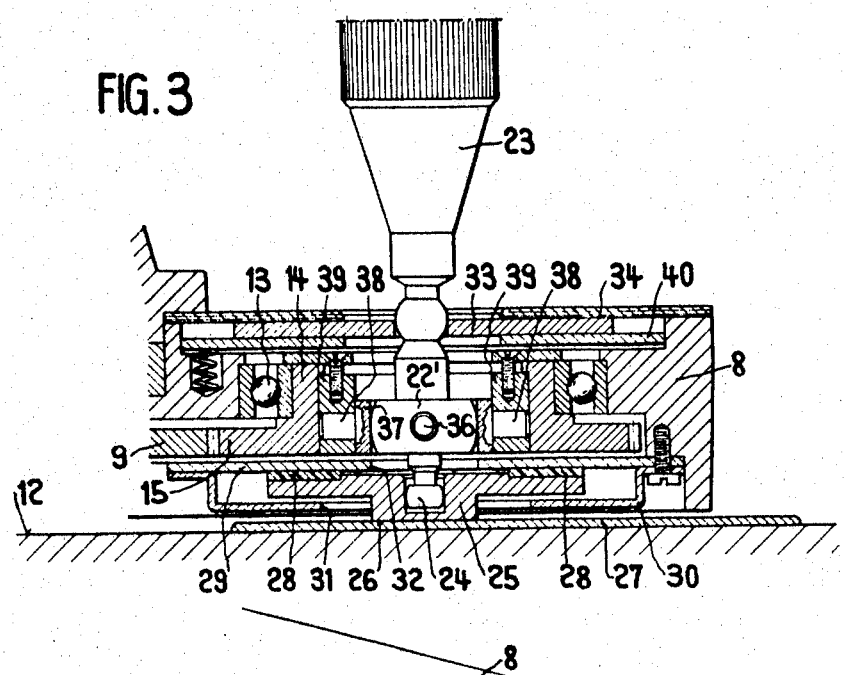
Figure 4:
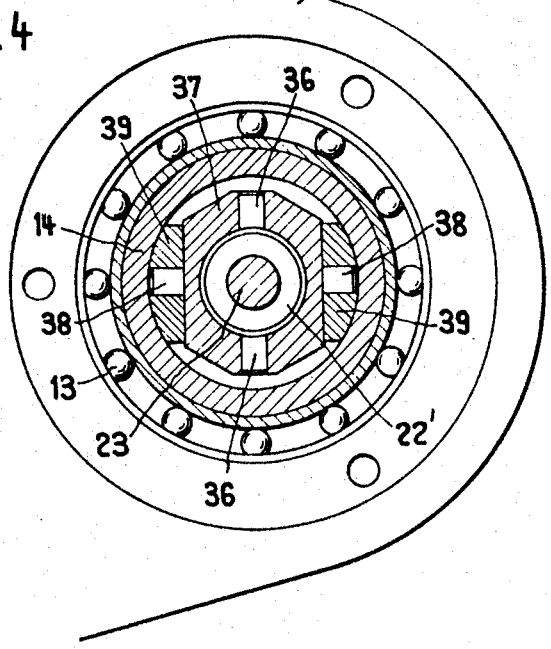

Two embodiments of the invention will now be explained in detail with reference to the accompanying drawings wherein:

FIG. 1 is a vertical section of the first embodiment,
FIG. 2 is a section along line II—II in FIG. 1,
FIG. 3 is a vertical section of the second embodiment and
FIG. 4 is a partial horizontal section of the second embodiment.

Referring now particularly to FIGS. 1 and 2, a slit lamp not shown in the drawing, comprises a vertical column 1 serving as a common pivot shaft for the microscope and the illuminating apparatus of the slit lamp. A slit lamp of this type having a common vertical pivot shaft (6') is shown in my U.S. Patent No. 2,999,422. The above parts of the slit lamp are located at the operator's side on the right of column 1 (FIG. 1). Column 1 is fixed to one end of a plate-shaped carrier 2. The center of carrier 2 is connected to a guide column 3 mounted for vertical displacement in a bore 4 by means of bearing balls. A spindle 5 is screwed to the right-hand end of the plate 2, the lower threaded end of the spindle engaging the internal thread of a hub 6. The hub 6 is rotatably mounted in the body 8 by means of a ball bearing 7 and is made in one piece with a toothed wheel 9. The body 8 is mounted for axial or longitudinal displacement along a shaft 11 by means of a ball bearing 10. The ends of shaft 11 not shown in the drawing have rollers guided on parallel rails so that the body 8 may be displaced practically without friction along such rails and along the shaft 11 in any direction in a horizontal plane on the base 12.

A sleeve 14 made in one piece with a toothed ring 15 is rotatably mounted in a recess of the body 8 by means of a ball bearing 13. Two rings 18 and 19 of self-lubricating plastics material, for instance "Teflon" are accommodated between a shoulder 16 of the sleeve 14 and a clamping ring 17. Rings 18 and 19 have conical surfaces 20 and 21 respectively, these surfaces forming a bearing pan enclosing a spheric portion 22 of an actuating lever 23. The lever may be swung in all desired directions. Since there is some axial clearance between rings 18 and 19 and since the lower ring 19 is urged upwardly by leaf springs 41 acting onto ring 17, the surfaces 21 and 20 of the bearing pan portions 18 and 19 are urged against the spheric portion 22 of the actuating lever 23 so that swinging into different inclined positions and rotation of the actuating lever round its own longitudinal axis relatively to the bearing pan is only possible by overcoming a predetermined friction. Thus, the actuating lever 23 is supported in a rotatable carrier constituted by sleeve 14, by rings 18 and 19 allowing swinging of the actuating lever to any inclined position.

The lower end of the actuating lever 23 has a head 24 with a spheric outer surface engaging practically without clearance a cylindrical bore of a plate 25. The lower plane surface 26 of the plate 25 is supported on a plane plate 27. Bearing pads 28 of plastics material are provided at the upper surface of plate 25, these pads supporting a plate 29 screwed to the body 8. Plate 25 is accommodated within a cover 30 and its extension with the bearing surface 26 projects with ample lateral clearance through an opening 31 of cover 30. Similarly, the lower end of the actuating lever 23 passes with ample clearance through an opening 32 of plate 29 so that the lever 23 and the plate 25 coupled thereto may be swung and shifted in horizontal direction respectively in all desired directions. Above the spheric portion 22 the shaft of lever 23 passes without clearance through a covering plate 33 shiftably mounted to all sides below a cover plate 34.

Operation of the described device is as follows:

For coarse adjustment of the instrument in horizontal direction the body 8 is laterally shifted on its base 12 whereby the plate 25 slides on plate 27. In this case the fine adjusting device is inoperable. When the coarse adjustment is effected, the actuating lever 23 is swung towards the direction in which a fine horizontal adjustment is desired. Hereby the plate 25 adheres to the plate 27 and by the actuating lever 23 swinging in the bearing pan 18, 19, the body 8 wherein the pan is mounted without clearance is shifted in the desired direction. During this fine adjustment the plate 29 slides on the plastics bearing pads 28 of plate 25. When vertical fine adjustment of the instrument is simultaneously or subsequently required, the actuating lever 23 is rotated round its longitudinal axis in any desired inclined position. Since the spheric portion 22 is maintained in the bearing pan portions 18 and 19 with some friction, the rotation of the actuating lever is transmitted to the bearing pan portions and to the rotatable sleeve 14 and through gears 15 and 9 to the threaded sleeve or spindle nut 6. The spindle 5 is thereby lifted or lowered according to the rotating direction, thereby lifting or lowering the plate 2 and the slit lamp mounted thereon. For limiting the vertical adjustment a stop bolt 36 is provided. Further, pressure coil springs 35 are inserted in bores of the body 8 and sleeves fixed to the plate 2 respectively, for partial compensation of the weight of the slit lamp (FIG. 2).

The arrangement of column 1 of the instrument on the sidewise extending plate 2 allows spacing of the body 8 and its vertical guide means from the left edge of the base 12, for instance a table. It may thus be avoided that a patient touches the left end of the body 8 with his breast and shifts the instrument from its adjusted position.

In the embodiment illustrated in FIGS. 3 and 4, similar parts are designated with the same numerals as in FIGS. 1 and 2 and need no further explanation. Instead of a friction bearing for the spheric portion 22 of the actuating lever 23 a cardan joint is provided. The spheric portion 22' of lever 23 is rotatably mounted in the intermediate ring 37 by means of pins 36 and ring 37 is rotatably mounted in bearing blocks 39 by means of pins 38. Blocks 39 are fixed in the sleeve or rotatable carrier 14. The cover plate 33 is disposed on top of a spring loaded plate 40 in order that sliding of the plate 33 between plates 34 and 40 is opposed by a predetermined friction tending to maintain the actuating lever 23 in any position into which it is swung.

Operation of this embodiment corresponds to the operation described above for the embodiment of FIGS. 1 and 2 with the exception that the rotation of the actuating lever 23 is positively transmitted through the cardan joint while this motion is only transmitted by friction in the embodiment of FIGS. 1 and 2.

Vertical adjustment of the instrument may also be actuated by another mechanism. As an example, the actuating lever may directly operate a spindle actuating a piston displaceably in a cylinder communicating with a lifting cylinder of the instrument through a flexible pipe. Instead of a piston an axially compressible corrugated tube may be operated by the actuating lever. Further, a Bowden cable may be used instead of a hydraulic system. The actuating lever may also be coupled to a flexible shaft directly transmitting the lever rotation to the nut or spindle for vertical adjustment of the instrument.

What I claim is:

1. A device for fine adjustment of optical, particularly ophthamological instruments, comprising a mechanism for fine vertical adjustment and an actuating lever swingable into any desired inclined position for fine adjustment in a horizontal plane, said actuating lever being rotatable round its longitudinal axis and operatively coupled with said mechanism for fine vertical adjustment of the optical instrument, and a part slideably supported on a horizontal surface, the lower end of said actuating lever swingably and rotatably engaging said part.

2. A device according to claim 1, comprising a plate slideably supported on said surface, a recess in the upper face of said plate and a spheric portion at the lower end of said actuating lever engaging into said recess without clearance.

3. A device according to claim 1, comprising a rotatable carrier, said actuating lever being supported in said carrier by means allowing swinging of the actuating lever to any inclined position relatively to the carrier but opposing rotation of the lever round its axis relative to the carrier, and rotatable means for fine vertical adjustment of the instrument coupled with said rotatable carrier.

4. A device according to claim 3, comprising a rotatable toothed ring, a bearing pan mounted in said toothed ring, a portion of said actuating lever having a spheric outer surface mounted in said bearing pan, a spindle and spindle nut for vertical adjustment of the instrument, and a toothed wheel fixed to said spindle nut and meshing with said toothed ring.

5. A device according to claim 4, wherein said portion of the actuating lever having a spheric outer surface is made of a self-lubricating material such as plastics material.

6. A device according to claim 4, said bearing pan being made of self lubricating material, such as plastics material.

7. A device according to claim 4, wherein said bearing pan has two halves and spring means are provided for urging said halves against said portion of the actuating lever having a spheric outer surface.

8. A device according to claim 3, comprising a cardan joint interconnecting said rotatable carrier with said actuating lever.

References Cited

UNITED STATES PATENTS

| | | | |
|---|---|---|---|
| 3,403,957 | 10/1968 | Wilkinson | 351—38 |
| 2,539,120 | 1/1951 | Courtot | 74—471 |
| 2,940,357 | 6/1960 | Oswald | 351—38 |
| 3,204,584 | 9/1965 | Mladjan. | |

DAVID SCHONBERG, Primary Examiner

U.S. Cl. X.R.

74—471; 269—58